US006348691B1

(12) United States Patent
Sandell et al.

(10) Patent No.: US 6,348,691 B1

(45) Date of Patent: Feb. 19, 2002

(54) MOTION DETECTOR WITH EXTRA-WIDE ANGLE MIRRORED OPTICS

(75) Inventors: Donald R. Sandell, San Jose; Wade Lee, Danville, both of CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 0 days.

(21) Appl. No.: 09/476,422

(22) Filed: Dec. 30, 1999

(51) Int. Cl.[7] .................................................. G01J 5/02

(52) U.S. Cl. ................ 250/353; 250/342; 250/DIG. 1; 340/567

(58) Field of Search .......................... 250/DIG. 1, 342, 250/353; 340/567

(56) References Cited

U.S. PATENT DOCUMENTS

| | | | | |
|---|---|---|---|---|
| 2,198,725 A | | 4/1940 | Smith | 250/338.1 |
| 3,203,306 A | * | 8/1965 | Lefferts | 359/742 |
| 3,551,684 A | | 12/1970 | Burton | 250/239 |
| 3,703,748 A | | 11/1972 | Berman | 340/567 |
| 4,321,594 A | * | 3/1982 | Galvin et al. | 340/567 |
| 4,625,115 A | | 11/1986 | Guscott | 250/353 |
| 4,703,171 A | * | 10/1987 | Kahl et al. | 250/221 |
| 4,734,585 A | | 3/1988 | Owers | 250/353 |
| 4,939,359 A | | 7/1990 | Freeman | 250/221 |
| 5,089,704 A | | 2/1992 | Perkins | 250/342 |
| 5,282,118 A | | 1/1994 | Lee | 362/276 |
| 5,434,764 A | | 7/1995 | Lee et al. | 362/276 |
| 5,575,557 A | | 11/1996 | Huang et al. | 362/276 |
| 5,590,953 A | | 1/1997 | Haslam et al. | 362/276 |
| 5,608,220 A | | 3/1997 | Wieser et al. | 250/353 |
| 5,626,417 A | | 5/1997 | McCavit | 362/276 |
| D382,082 S | | 8/1997 | Huang et al. | D26/142 |

* cited by examiner

*Primary Examiner*—Seungsook Ham
*Assistant Examiner*—Shun Lee
(74) *Attorney, Agent, or Firm*—Paul Y. Feng; Fulwider Patton Lee & Utecht, LLP

(57) ABSTRACT

A motion detector based on mirrored optics for use in decorative lighting fixtures. The motion detector includes a mirror assembly that may be disposed within decorative elements such as saucers and chimneys that are common elements of lighting fixtures. Apertures are defined in the decorative element to admit infra-red radiation, which impinges on the mirror assembly. The mirror assembly comprises a plurality of opaque elongate members that are azimuthally spaced about a central longitudinal axis in such a way as to define an alternating sequence of open elongate slots and opaque elongate members. Each elongate member is formed with a mirror face on its inner surface which is generally facing the central longitudinal axis, and a PIR sensor is also disposed at the longitudinal axis. The elongate members and mirror faces define a plurality of detection zones in the motion detector field of view at two different vertical levels of view, each vertical level of view having a characteristic optical path associated with it. In a first optical path for monitoring the field of view in the far zones, infra-red radiation passes from an associated zone through one of the slots between two elongate members and is reflected from one of the mirror faces and concentrated onto the sensor. In the second characteristic optical path for monitoring the field of view in the near zones, infra-red radiation passes from an associated zone through one of the slots and on to the sensor without being deflected by any of the mirror faces. These two types of optical paths may be achieved in a full 360 degree zonal pattern for both the far zone and the near zone. The mirror assembly avoids the need for Fresnel lens optics.

10 Claims, 6 Drawing Sheets

FIG._4
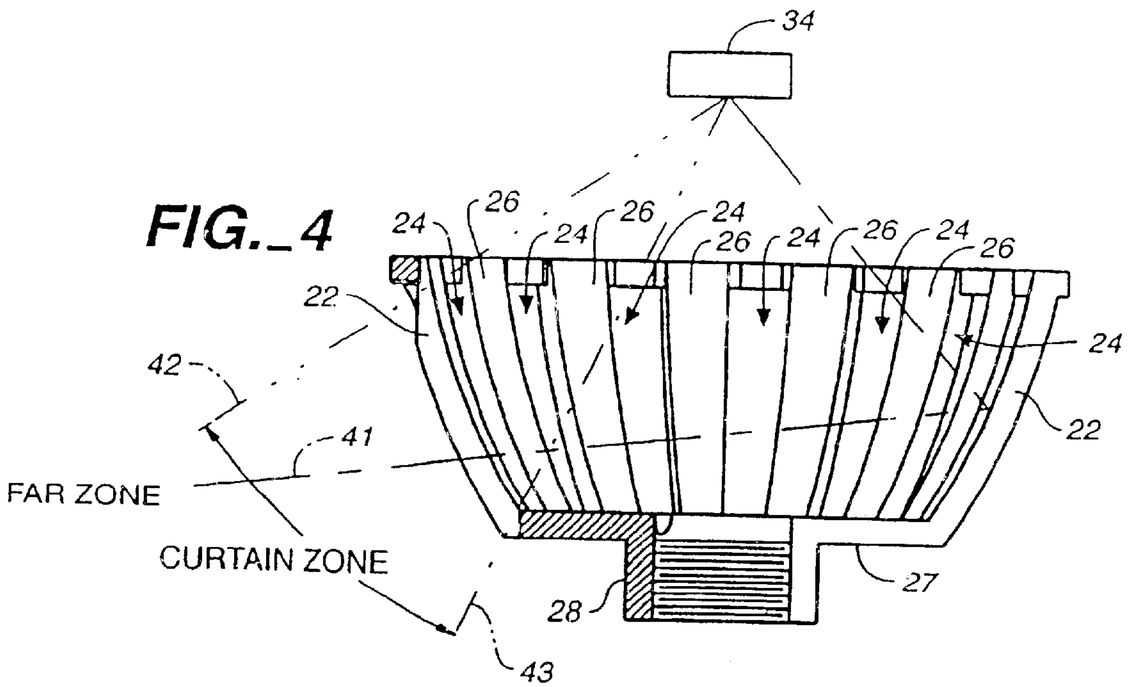
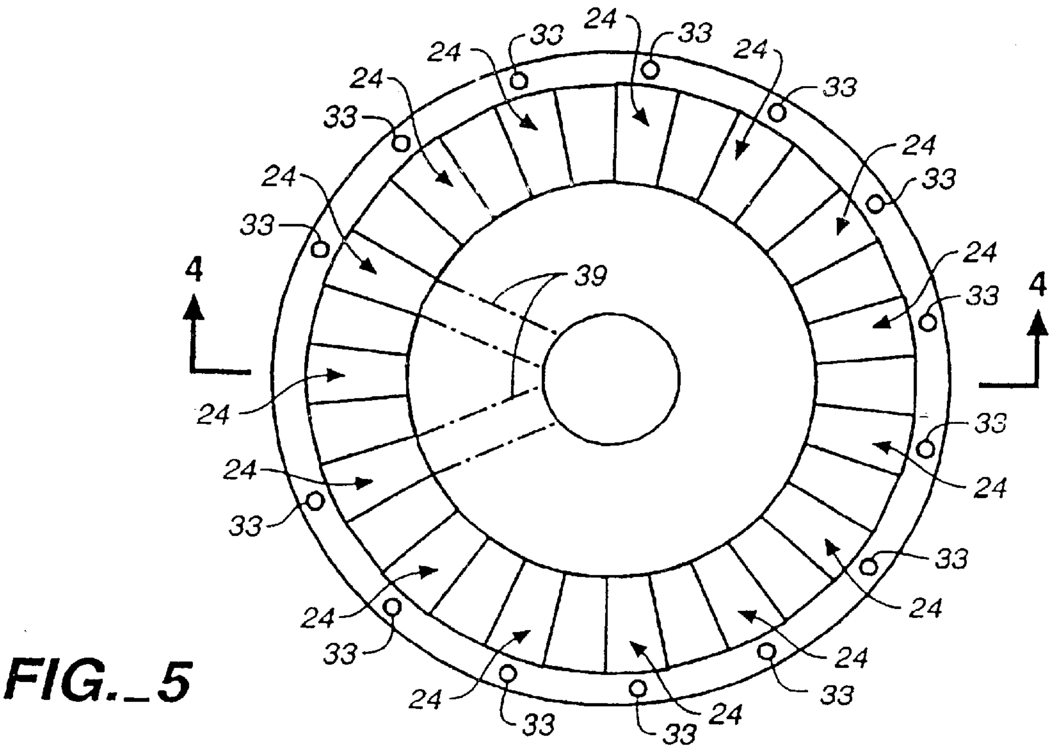
FIG._5

MOTION DETECTOR WITH EXTRA-WIDE ANGLE MIRRORED OPTICS

BACKGROUND OF THE INVENTION

The present invention relates to passive infra-red motion detectors of the type used in residential outdoor lighting fixtures, for example, to illuminate a walkway or driveway when a person or automobile approaches. The invention is more particularly directed to arrangements for making the motion detector an inconspicuous element of the lighting fixture and to a mirror arrangement suitable for use in such motion detectors.

Lighting fixtures that are activated by passive infra-red (PIR) motion detectors have long been available. PIR motion detectors were first used in the lighting field with utilitarian lighting such as flood lights or other area lighting. These early models employed assemblies of germanium lenses or multi-faceted mirrors or combinations of mirrors and lenses to direct infra-red radiation from an object moving in the field of view to a PIR sensor disposed in a housing. The early housings tended to be bulky and quite conspicuous.

With the development of the flexible plastic segmented Fresnel lens, motion detector housings could be made more compact and much less conspicuous. A Fresnel lens of the sort used in connection with motion detectors comprises a thin sheet of flexible plastic material that permits infra-red radiation to pass through it and on which are formed a number of individual Fresnel lens segments or lenslets. See for example U.S. Pat. No. 3,203,306 to Lefferts for an individual Fresnel lens segment formed on such a plastic sheet and U.S. Pat. No. 4,321,594 to Galvin or U.S. Pat. No. 4,703,171 to Kahl et al. for a segmented Fresnel lens having a plurality of lens segments side-by-side on a plastic sheet.

As motion detectors became more compact and less conspicuous, they were applied to decorative lighting fixtures, as well as utilitarian floodlights, since the distraction from the decorative aspects of the fixture could be held to a tolerable level.

In recent years the trend has been to integrate the motion detector into the decorative light fixture itself to make the motion detector less obtrusive either by concealing it altogether or at least by giving it a decorative appearance so that it does not detract appreciably from the ornamental style of the light fixture. Examples of PIR lighting fixtures that endeavor either to conceal the motion-detecting unit or to embellish it so as to enhance its decorative appearance may be seen in U.S. Pat. Nos. 5,282,118 and 5,434,764 to Lee et al.; U.S. Pat. No. 5,575,557 and U.S. Pat. No. Des. 382,082 to Huang et al.; U.S. Pat. No. 5,590,953 to Haslam et al.; and U.S. Pat. No. 5,626,417 to McCavit.

Typically, the flexible plastic lens was formed to be a part of a wall of some portion of the fixture. This construction may impose a limitation on the lens optics. In decorative fixtures the nature of the fixture body—its curvature, slope, profile and overall shape—is chosen primarily by aesthetic considerations to give the fixture its decorative appearance and to some extent by manufacturability considerations to maintain a lower cost. The resulting fixture body design, however, may then constrain the optics of the segmented Fresnel lens, which will generally follow the contour of a wall of the fixture body. That is, the Fresnel lens may be disposed in a fixture wall at an angle or as part of a curved surface in such a manner that it may impair the ability of the lens to focus radiation from a desired direction and in a desired intensity on the sensor. Alternatively, the aesthetic design of the light fixture may be compromised so as to provide a more favorable optical environment for the segmented Fresnel lens.

SUMMARY OF THE INVENTION

The present invention provides a motion detector based on mirrored optics that is well suited for use in decorative lighting fixtures in a variety of locations while avoiding the disadvantages of Fresnel lenses and at the same time providing coverage for a very wide field of view that may extend to 360 degrees.

Many of today's decorative lighting fixtures have design styles deriving from early oil-burning coach or carriage lanterns. Such designs typically contain saucer-shaped design elements that originally served as oil reservoirs, cylindrical design elements that originally served as shields, and stylistically decorated generally axially symmetric cylindrical-like elements, commonly referred to as chimneys, having a number of slots formed in them that originally served as vents. The present invention is able to take advantage of such traditional stylistic elements of decorative lanterns to house a motion detector while avoiding the disadvantages of Fresnel lens optics and without compromising the motion detector field of view.

Briefly, this is achieved with a mirror assembly that may be disposed within decorative elements such as saucers and chimneys that are common elements of lighting fixtures. One or more apertures are defined in the decorative element to admit infra-red radiation, which impinges on the mirror assembly. The mirror assembly comprises a plurality of opaque elongate members that are azimuthally spaced about a central longitudinal axis in such a way as to define an alternating sequence of open elongate slots and opaque elongate members. Each elongate member is formed with a mirror face on its inner surface which is generally facing the central longitudinal axis, and the PIR sensor is also disposed substantially at the longitudinal axis. The elongate members and mirror faces define a plurality of detection zones in the motion detector field of view at two different vertical levels of view, each vertical level of view having a characteristic optical path associated with it. In a first optical path for monitoring the field of view at a first vertical level (the far zone), infra-red radiation passes from an associated zone through one of the slots between two elongate members and is reflected from one of the mirror faces and concentrated onto the sensor. In the second characteristic optical path for monitoring the field of view at a second vertical level (the near zone), infra-red radiation passes from an associated zone through one of the slots and on to the sensor without being deflected by any of the mirror faces. These two types of optical paths may be achieved in a full 360 degree zonal pattern for both the far zone and the near zone.

Various other aspects, advantages, and novel features of the invention are described below or will be readily apparent to those skilled in the art from the following specifications and drawings of illustrative embodiments.

BRIEF DESCRIPTION OF THE DRAWINGS

FIG. 4 is a cross-sectional view of the mirror assembly along the line 4—4 in FIG. 5 showing optical paths for two zones of detection.

FIG. 5 is a plan view of the mirror assembly from FIG. 3.

DETAILED DESCRIPTION OF ILLUSTRATIVE EMBODIMENTS

Figure 1:
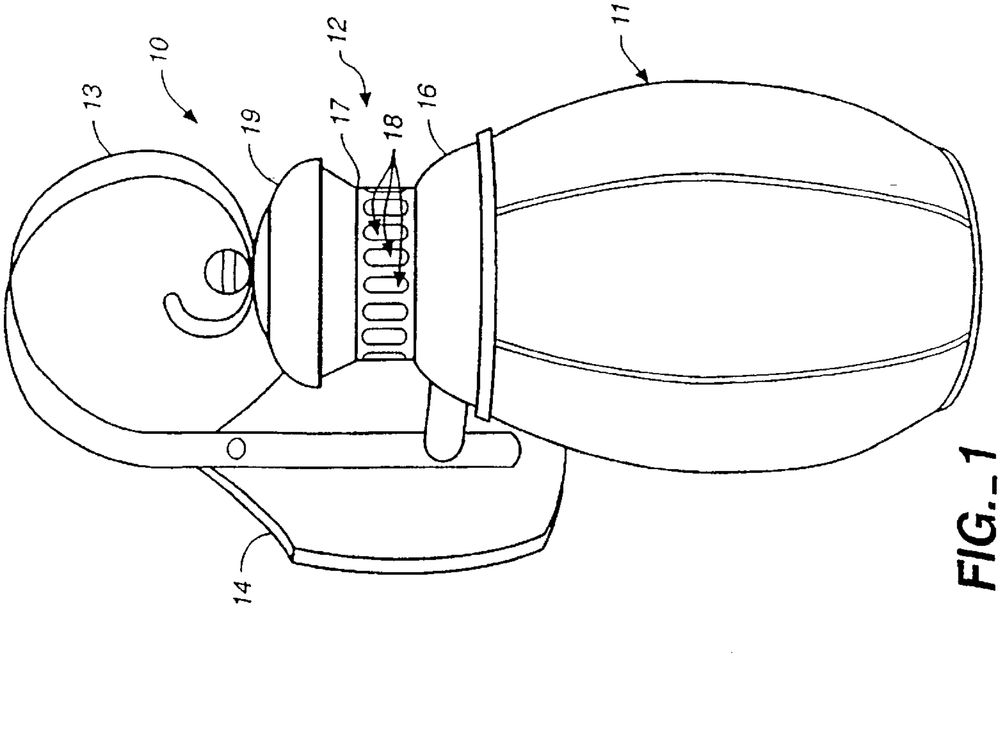
FIG. 1 is an overall perspective view of a lighting fixture incorporating the invention.

FIG. 1 shows an embodiment of decorative lighting fixture 10 including a motion detector according to the present invention. Fixture 10 includes a stylish globe assembly 11 which houses a light bulb. The globe assembly hangs from a decorative enclosure 12, which in turn hangs from a decorative bracket 13. The fixture is mounted to an exterior wall of a house or other structure by mounting base 14. The decorative enclosure 12 pictured in FIG. 1 has a form sometimes figuratively referred to either as a cupola or chimney having a base member 16 that supports the globe assembly and a light socket extending into the globe assembly, a cylindrical mid-section 17 formed with a plurality of stylistic apertures 18 positioned around mid-section 17, and a top decorative element 19, sometimes referred to as a font, which is secured to mounting bracket 13.

Decorative enclosure 12, and in particular slotted mid-section 17, derive their shape historically from the so-called chimneys that were present in oil lamps, in which apertures 18 served as vents for heat and fumes. Although the vents are no longer needed in present-day electric lighting fixtures, the chimney structure nevertheless remains as a matter of style. In the present invention the chimney structure in the lighting fixture embodiment of FIG. 1 serves as a motion detector housing.

In general, a motion detector housing as used with the present invention may be shaped to have a decorative external appearance, such the housing provided by enclosure 12, and is disposed to form an integral part of the lighting fixture. As used herein "an integral part of" or "integral to" the lighting fixture is intended to mean incorporated into the fixture itself so as to form a harmonious part of the fixture design, as opposed to being independently mounted or being an inharmonious, stand-apart adjunct to the fixture. Thus, "integral" to the fixture is intended to distinguish a motion detector located in the fixture itself from one mounted separately or one mounted on a backplate.

In the example of FIG. 1 decorative element 12 is a common pre-existing shape of decorative element for lighting fixtures. With the present invention such pre-existing decorative elements may be adapted for use as a motion detector housing without having to compromise the overall pre-existing aesthetic nature of the lighting fixture. The invention is not limited to the use of pre-existing shapes for the motion detector housing, however, and the designer of lighting fixtures will have greater freedom of design to choose whatever ornamental shape and appearance are desired for the motion detector housing since, as will become apparent below, the external surfaces of the motion detector housing in the present invention do not have to play an active optical role in the functioning of the motion detector.

Figure 2:
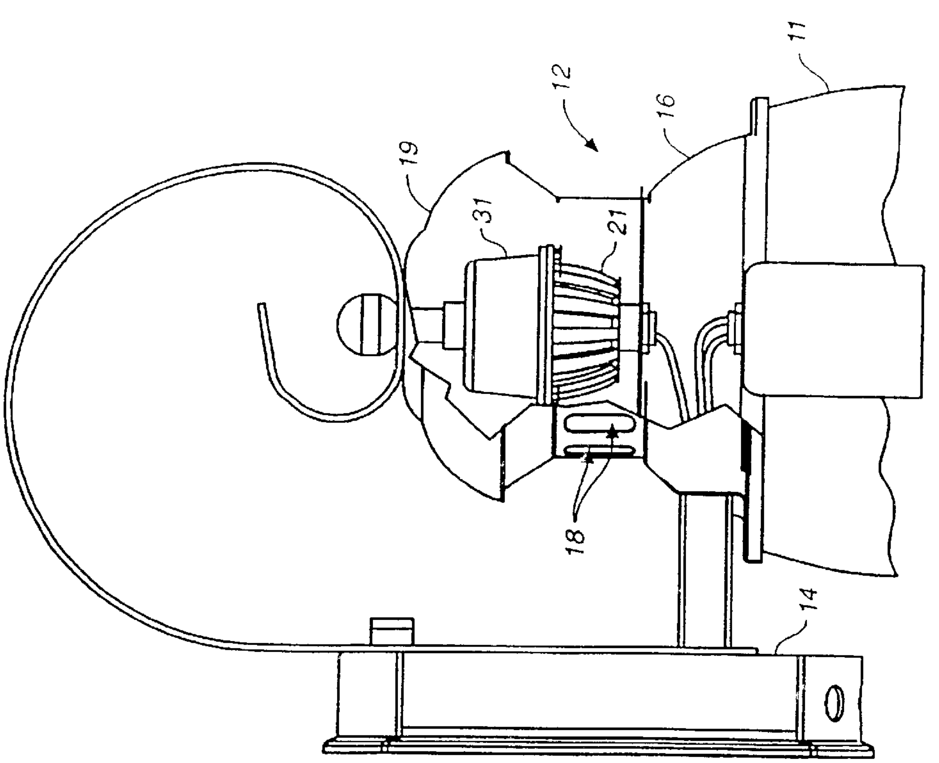
FIG. 2 is a side elevational view of a portion of the lighting fixture of FIG. 1 partially cutaway to show a mirror assembly disposed therein.

The motion detector optics in the embodiment of FIG. 1 will now be described with reference to FIGS. 2–5. FIG. 2 shows an elevational view of the fixture of FIG. 1, in which a portion of enclosure 12 has been partially cut away to expose the motion detecting mechanism mounted therein. The full motion detecting assembly may be seen with reference to FIG. 3. The motion detecting mechanism comprises a slotted mirror assembly, indicated generally at 21, which is formed of a plurality of opaque elongate members 22 disposed about a central longitudinal axis 23. Elongate members 22 are azimuthally spaced about axis 23 to define an alternating sequence about axis 23 of the opaque elongate members 22 and open elongate slots 24 therebetween. Here "azimuth" refers to the angular displacement around the axis 23, that is, the horizontal angle if axis 23 is taken to be the vertical. FIG. 5 shows a view of mirror assembly 21 looking down from above, in which the elongate members may be seen to be arranged in a ring around axis 23. Each elongate member 22 is formed with a mirror face 26 on its inner surface, that is, on the surface generally facing toward longitudinal axis 23. The elongate members are supported at their lower ends by an annular mirror base support 27 in the form of a disk with a hole in the middle and at their upper ends by an annular mirror top support 28 in the form of a thin ring. In the illustrated embodiment a cylindrical collar 28 is attached to annular mirror base support 27 for securing the mirror assembly in position. Collar 28 is formed with inside threads for receiving a threaded rod for securing to a support fixed within decorative housing 12. Fitting on the top of mirror assembly 21 is a sensor housing cap 31. Cap 31 is formed with a plurality of pegs 32, which align with corresponding holes 33 in annular mirror top support 28.

PIR sensor 34 is positioned above the mirror assembly along axis 23. Sensor 34 is mounted on printed circuit board 35. Overlying the sensor and printed circuit board is a mask 36, the purpose of which will be explained below. Mask 36 and printed circuit board 35 are secured to brackets within cap 31 by screws 37. Electrical wires carrying power to printed circuit board 35 may be routed in any manner that does not interfere with the optical performance. In the illustrated embodiment the wires may be routed outside mirror assembly 21 behind one of the elongate members 22 and from there passing into the mirror assembly at the top of one of the slots 24. The wires then pass through a notch 38 provided in mask 36 to reach the printed circuit board. For alternative routing, troughs 39 (shown in phantom) may be formed in bottom support 27 to serve as wireways for wires to pass from outside the mirror assembly to the central hole in the bottom support. The determination of appropriate wire routing to suit the needs of the particular fixture configuration is well within the ordinary skill in the art.

The illustrated and described configuration of mirror faces 26 and slots 24 defines a plurality of detection zones in the motion detector field of view at two different vertical levels of view. The two vertical levels of view correspond to two different types of optical paths followed by the IR radiation from a respective zone to sensor 34, The vertical levels of view are illustrated in FIG. 4. The mirror faces 26 define a first type of optical path 41 from a first vertical level of view constituting the far detection zones. IR radiation from a far zone passes through a slot 24 and is reflected by a diametrically opposed mirror face 26 up to sensor 34. The mirror faces are focusing mirror faces, which are appropriately curved to concentrate the IR radiation from the far zones onto sensor 34. The specific focal length will depend on the particular installation and desired range. The determination of such focal lengths is routine in the at of PIR motion detector optics. The angular width of the mirror faces determines the width of the detection zones, unless the slots are so narrow that they mask off the impinging IR radiation before it reaches the mirror face.

The second type of optical path defines a more down-looking vertical level of view constituting a near zone. IR radiation from a near zone passes through a slot 24 directly to sensor 34 bypassing the mirror faces 26 altogether. In the embodiment of FIGS. 1–5 the second optical path goes straight to sensor 34 without the intermediation of any further mirrors or lenses, that is, without undergoing any further reflection or other optical variation at all. In this optical path the IR radiation is not focused onto the sensor, but goes straight to the sensor without focusing. Nevertheless, sufficient intensity is achievable for monitoring near zones. This type of optical path defines a zone of taller expanse figuratively referred to as a curtain zone and delineated in FIG. 4 by the extreme optical paths 42 and 43. The width of the detection zone is determined by the spacing of the slots. In this way the slots serve a dual function. First, they permit the IR radiation to pass through for reflecting off of a diametrically opposed mirror face to define the first optical path from the far zones. Second, they mask off IR radiation to define the azimuthal extent of the zones of the second optical path. Stated differently, the inner faces of elongate members 22 serve to define mirror faces for defining the first level of view, and the outer faces of elongate members 22 serve to mask IR radiation so as to define the zone structure of the near zones. The result is a motion detector providing far and near vertical levels of view and capable of a 360-degree field of view for both vertical levels (assuming that elongate members 22 are distributed all the way around axis 23 in a ring).

Of course, if the lighting fixture containing the present motion detector is mounted on a wall, then some portion of the mounting mechanism or the wall itself will block part of the field of view and a full 360 degrees of view will neither be necessary nor possible. Even in this situation, however, the above construction assures that the full angular reach of the field of view possible in a given installation will in fact be achieved. For other types of mountings, for example, for pole laps, a full 360 degrees of view may be achieved.

Figure 6:
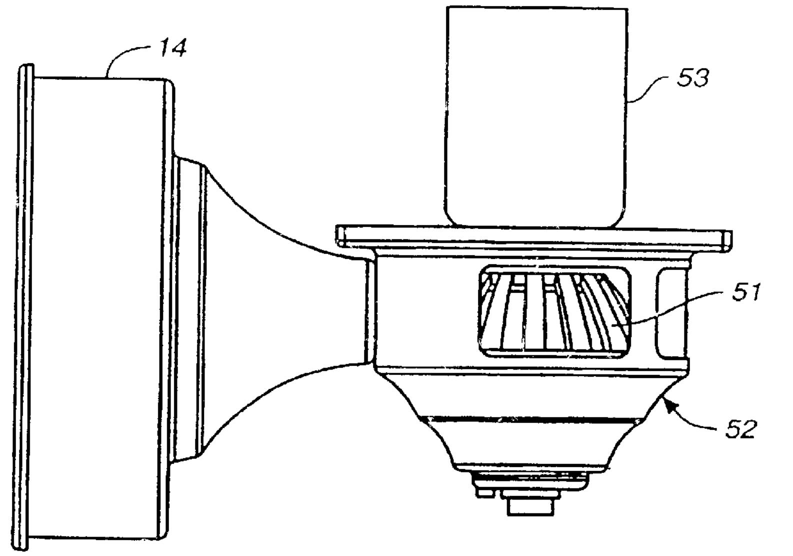
FIG. 6 is a partially cutaway side elevational view of a portion of lighting fixture showing another embodiment of motion detector according to the invention.
Figure 8:
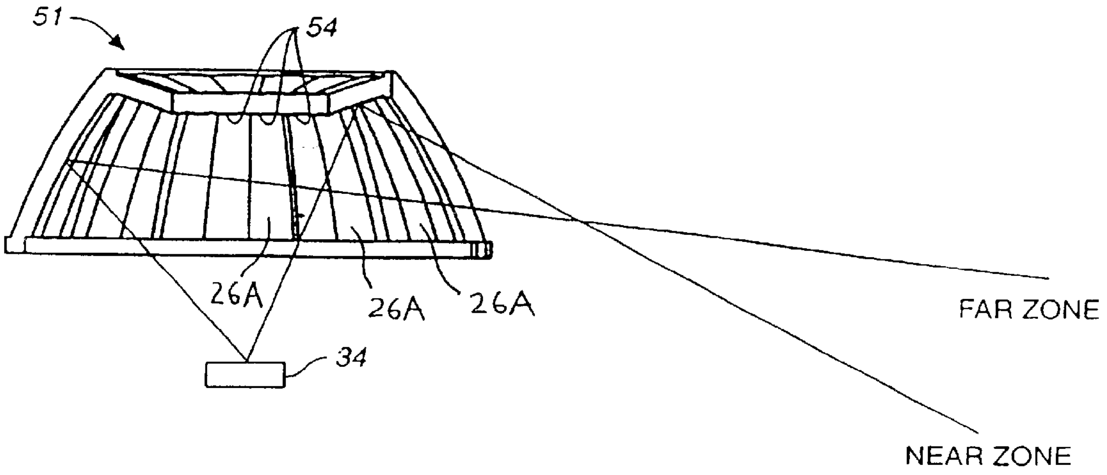
FIG. 8 is a cross-sectional view of the mirror assembly of FIG. 7 showing optical paths for two zones of detection.
Figure 7:
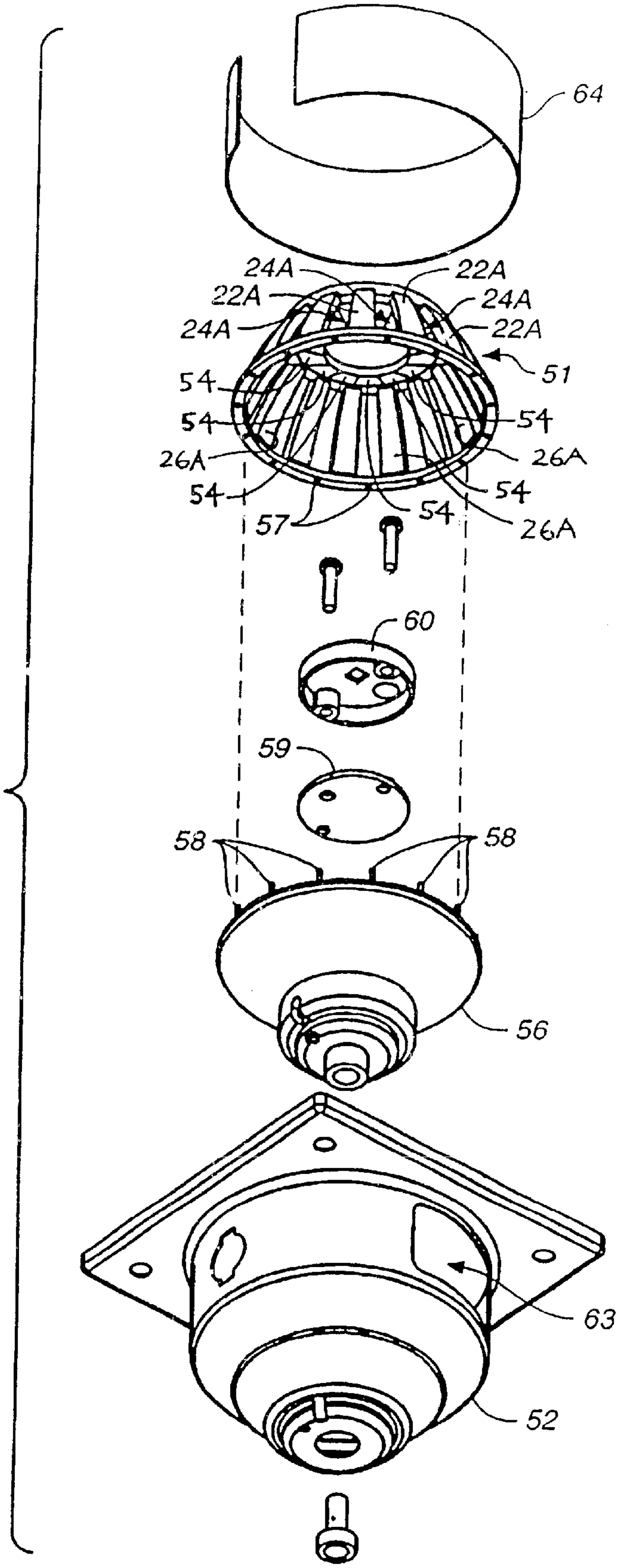
FIG. 7 is an exploded isometric view of the embodiment of motion detector assembly as used in the lighting fixture of FIG. 6.

FIGS. 6–8 show an alternative embodiment of mirror assembly according to the invention. FIG. 6 has been partially cut away to show a mirror assembly 51 according to this embodiment disposed within a fixture base 52. Here the globe assembly (not shown) and light socket 53 are mounted above base 52. Mirror assembly 51 is formed of an alternating sequence of elongate members 22A and slots 24A as before. Now, however, a second plurality of mirror faces 54 are included which are disposed about the central longitudinal axis and which play an optical role in defining the second optical path from the near zone. The mirror faces 54 are disposed at a substantially greater angle to the longitudinal axis than are the mirror faces 26A on the inner surfaces of elongate members 22A. As seen in FIG. 8, IR radiation from a near zone now passes through a slot 24A and reflects off of a mirror face 54 directly to sensor 34 without the intermediation of any further mirrors or lenses. In the illustrated embodiment mirror faces 54 are flat and non-focusing so they serve merely to change the direction of the second optical path, thereby permitting sensor 34 to be located below the mirror assembly. The mirror faces 54 may also be focusing mirrors if, for example, it is desired for the second optical path to cover an intermediate zone where some concentration of the IR radiation on the sensor will generally be needed to achieve sufficient sensitivity. The first optical path in the embodiment of FIG. 8 for monitoring the far zone is formed the same as in the first embodiment described above.

FIG. 7 shows the mounting of the mirror assembly in the second embodiment. Mirror assembly 51 is secured to a base member 56, which in turn is mounted within enclosure 52. As above, mirror assembly 51 is provided with a plurality of holes 57 spaced about the peripheral edge and base member 56 is provided with a plurality of mating pegs 58 for securing the two together. The sensor is mounted on printed circuit board 59, over which is disposed a mask 60.

Figure 3:
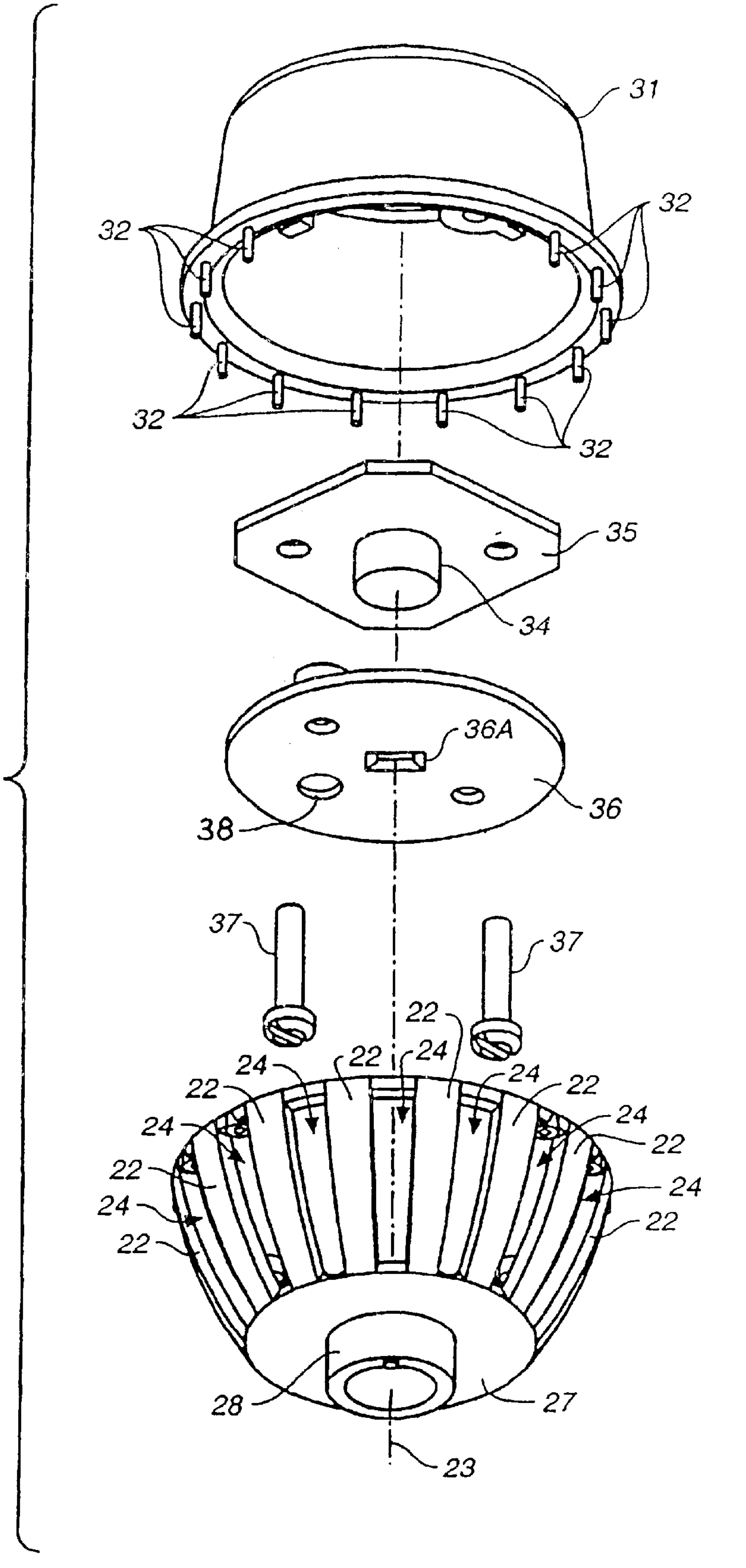
FIG. 3 is an exploded isometric view of an embodiment of motion detector assembly as used in the lighting fixture of FIG. 1.

The masks 36 and 60 shown in FIGS. 3 and 7 are provided to address a common problem arising when very wide fields of view are monitored by a single PIR sensor. The commonly available PIR sensors include two parallel sensitive strips 61 (see FIG. 9) each about one millimeter by two millimeters separated by a gap of about one millimeter. These two strips are sensitive to infra-red radiation and are connected in electrical opposition so that they cancel one another when IR radiation hits them both at the same time. This is generally a desirable feature because it cancels out the effects of many non-motion signals such as a rise in the ambient temperature. However, it can also lead to cancellation of motion signals in certain configurations that will naturally arise in extra-wide angle fields of view.

Figure 9:
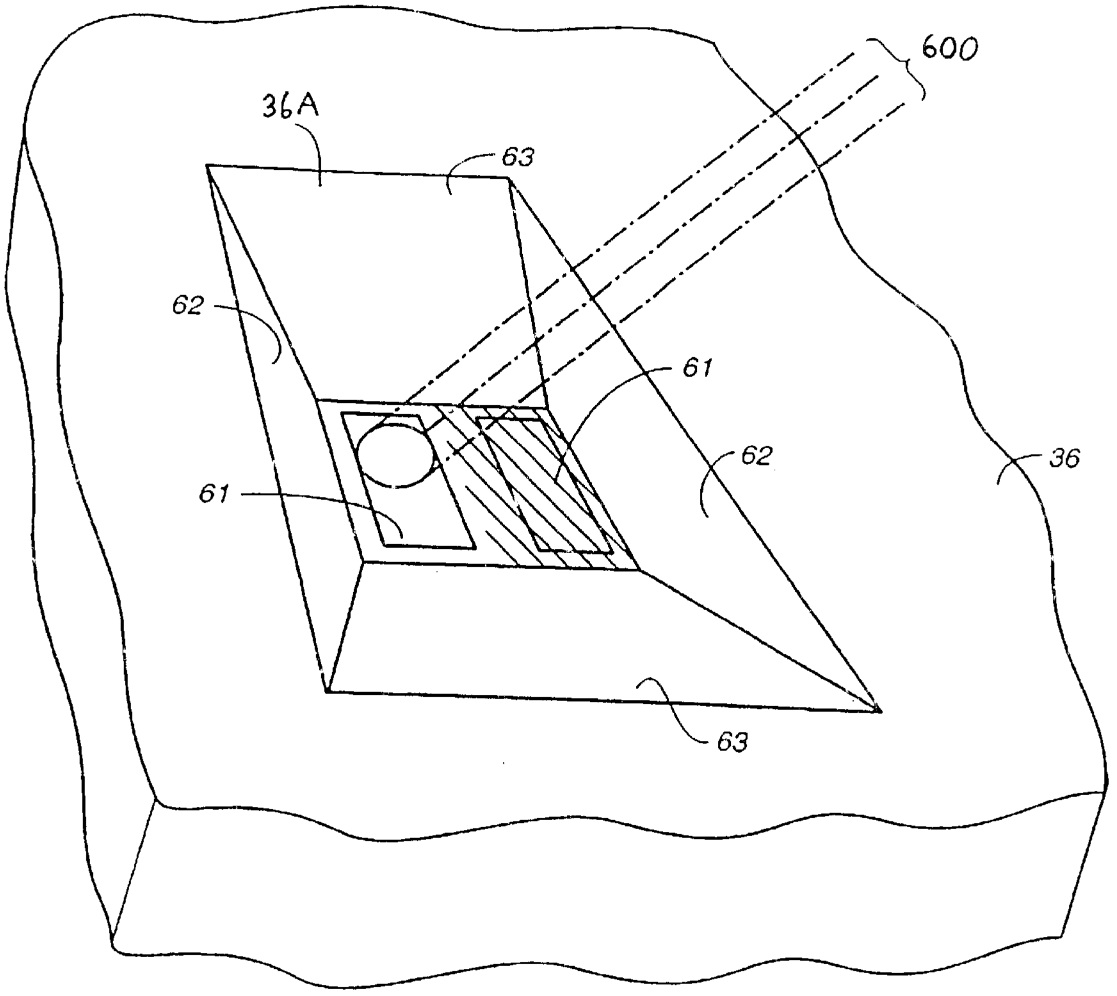
FIG. 9 is a perspective close-up view of a mask and sensor.

As a well understood in the art of PIR motion detection, when monitoring a narrow field of view, the optical elements are configured so that the IR radiation from a moving target crossing a zone will travel perpendicular to the two sensitive strips in the PIR sensor, so that the IR radiation first encounters one strip and then the other (assuming the target continues to move across the next zone). For a detection zone at 90 degrees to the first detection zone, however, the IR radiation from a target crossing the zone will now sweep along the long dimension of the sensitive strip. If the IR radiation beam from the target is not sufficiently focused, it may impinge upon both parallel strips 61 at the same time and thereby be canceled. The masks 36 and 60 serve to shade one of the strips to prevent such cancellation. FIG. 9 shows a portion of the mask 36 positioned above the two sensitive ships 61 of sensor 34. (The mask 60 is structured the same as 36.) The mask opening 36A is formed with steep sidewalls 62 parallel to the long dimension of the strips 61 and gradually sloping sidewalls 63 in the perpendicular dimension. As a beam 600 of IR radiation from a moving target in the field of view sweeps across the long dimension of one of the strips 61, it is shaded by side wall 62 from the other strip as indicated by the hatching in FIG. 9. The greater slope of the sidewalls 63 prevents such shadowing when the beam comes from the perpendicular direction.

Masking is a common problem in wide-angle motion detection arrangements with a single sensor and those skilled in the art of PIR motion detector optics will be able to devise other techniques. The particular example of FIG. 9 is offered here for illustration only and is not intended to limit the invention to this particular masking scheme or to any masking scheme at all.

The decorative enclosures constituting the motion detector housing must of course include an aperture by which radiation emanating from a detection zone will be admitted to the interior of the housing and thus to the mirror assembly. The apertures may themselves be disguised as decorative apertures such as the series of vents 18 in the decorative chimney element of the embodiment in FIG. 1, or they may be larger apertures such as the window apertures 63 seen in the embodiment of FIG. 6. If smaller slots are used, then the apertures could possibly mask some of the IR radiation from a target, and the positioning of the mirror assembly within the housing should be appropriately indexed to the housing and the and related to the positions of the aperture slots.

It is desirable in addition to provide a protective aperture cover such as illustrated at 64 in FIG. 7. Aperture cover 64 is transmissive to IR radiation and may be optically clear or tinted to match the decorative color of the fixture body. Aperture cover will generally be formed of flexible plastic and shaped to conform to the motion detector housing at the aperture. The aperture cover serves to protect the inside of the motion detector housing from the accumulation of dust or other debris and protects the sensor circuitry from wind currents that may adversely effect operation. Although not shown in the exploded view of FIG. 3, an aperture cover is preferably used in that embodiment as well.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, different mirror assembly mountings and wire routings may be employed, and various mirror shapes, focal lengths and sizes may be used to achieve various ranges, shapes and patterns of detection zones to suit the installation at hand. Furthermore, the mirror assembly and sensor mounting and sensor housing may be adapted to meet the stylistic demands of the motion detector housing that may comprise various enclosures forming a part of the lighting fixture. Modifications such as these, while not all explicitly illustrated herein, may nevertheless be made by any practitioner of routine skill in the art and are thus considered to fall within the scope of the invention, which is not limited to the above description and illustrations, but is defined by the appended claims.

What is claimed is:

1. A decorative lighting fixture activated by a passive infra-red (PIR) motion detector incorporated into said lighting fixture for monitoring motion in a field of view, said lighting fixture including a motion detector housing shaped to have a decorative external appearance and disposed to form an integral part of the lighting fixture, said motion detector housing defining an aperture for admitting infra-red radiation from the field of view and including a PIR sensor disposed within said motion detector housing for receiving said infra-red radiation, comprising:

a mirror assembly disposed within said motion detector housing and comprising a plurality of opaque elongate members disposed about a central longitudinal axis and azimuthally spaced about said axis to define an alternating sequence of open elongate slots and opaque elongate members, each said elongate member being formed with a mirror face on an inner surface thereof generally facing said longitudinal axis, said elongate members and mirror faces being formed and arranged to define a plurality of zones in said field of view;

wherein said sensor is disposed substantially at said longitudinal axis; and wherein said mirror faces and said slots are formed and arranged to define a plurality of first optical paths for monitoring said field of view at a first vertical level of view, each said first optical path directing infra-red radiation from an associated zone of said field of view admitted through said aperture and passing through a respective one of said slots to a respective one of said mirror faces and therefrom to said sensor, and wherein said elongate members and said slots are formed and arranged to define a plurality of second optical paths for monitoring said field of view at a second vertical level of view, each said second optical path directing infra-red radiation from an associated zone of said field of view admitted through said aperture and passing through a respective one of said slots to said sensor without being deflected by any of said mirror faces.

2. The apparatus of claim 1 wherein said alternating sequence of open elongate slots and opaque elongate members substantially surrounds said central longitudinal axis.

3. The apparatus of claim 1, further comprising an aperture cover transmissive to infra-red radiation, said aperture cover being disposed to cover said aperture and formed to conform generally to the shape of said motion detector housing.

4. The apparatus of claim 1 wherein each said second optical path is devoid of any mirrors or lenses, whereby radiation is directed directly to said sensor without the intermediation of any such mirrors or lenses.

5. The apparatus of claim 4 wherein each said first optical path includes a single said mirror face and is devoid of any other mirrors or lenses, whereby radiation directed to said sensor solely with the intermediation of said single mirror face.

6. The apparatus of claim 5 wherein said elongate members are formed to generally bulge outward from said central longitudinal axis and said mirror faces are formed on the inner surfaces thereof to focus radiation from said associated zones onto said sensor.

7. The apparatus of claim 1 further comprising a second plurality of mirror faces disposed about said central longitudinal axis and wherein each said second optical path includes a respective mirror face of said second plurality, whereby radiation is directed to said sensor solely with the intermediation of said respective mirror face of said second plurality.

8. The apparatus of claim 7 wherein the mirror faces of said second plurality are non-focusing.

9. A mirror assembly for use in a passive infra-red (PIR) motion detector incorporated into a decorative lighting fixture for monitoring motion in a field of view, said motion detector including a PIR sensor disposed in said lighting fixture for receiving infra-red radiation from said field of view, comprising:

a plurality of opaque elongate members disposed about a central longitudinal axis and azimuthally spaced about said axis to define an alternating sequence of open elongate slots and opaque elongate members, each said elongate member being formed with a mirror face on an inner surface thereof generally facing said longitudinal axis, said elongate members and mirror faces being formed and arranged to define a plurality of zones in said field of view;

wherein said mirror faces and said slots are formed and arranged to define a plurality of first optical paths for monitoring said field of view at a first vertical level of view when said mirror assembly is disposed in said lighting fixture, each said first optical path directing infra-red radiation from an associated zone of said field of view passing through a respective one of said slots to a respective one of said mirror faces and therefrom to a PIR sensor position at said longitudinal axis, and wherein said elongate members and said slots are formed and arranged to define a plurality of second optical paths for monitoring said field of view at a second vertical level of view when said mirror assembly is disposed in said lighting fixture, each said second optical path directing infra-red radiation from an associated zone of said field of view and passing through a respective one of said slots to said PIR sensor position without being deflected by any of said mirror faces.

10. The apparatus of claim 9 wherein said elongate members are spaced in a ring about said longitudinal axis thereby to monitor a 360 degree field of view.

* * * * *